Figure 1:
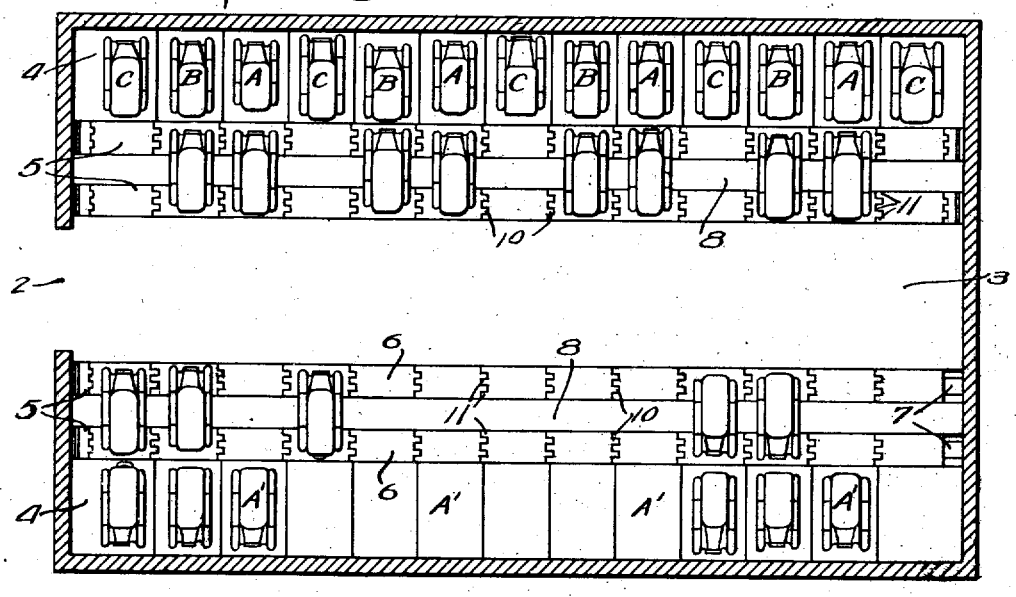

Sept. 20, 1927.

F. E. D'HUMY

STORAGE BUILDING

Re. 16,738

3 Sheets-Sheet 1

Original Filed June 24, 1925

INVENTOR
Fernand E. d'Humy.
BY
ATTORNEYS

Sept. 20, 1927.

F. E. D'HUMY

STORAGE BUILDING

Re. 16,738

3 Sheets-Sheet 2

Original Filed June 24, 1925

INVENTOR
Fernand E. d'Humy.
BY
ATTORNEYS

Sept. 20, 1927. F. E. D'HUMY Re. 16,738
STORAGE BUILDING
Original Filed June 24, 1925 3 Sheets-Sheet 3
Fig. 9.
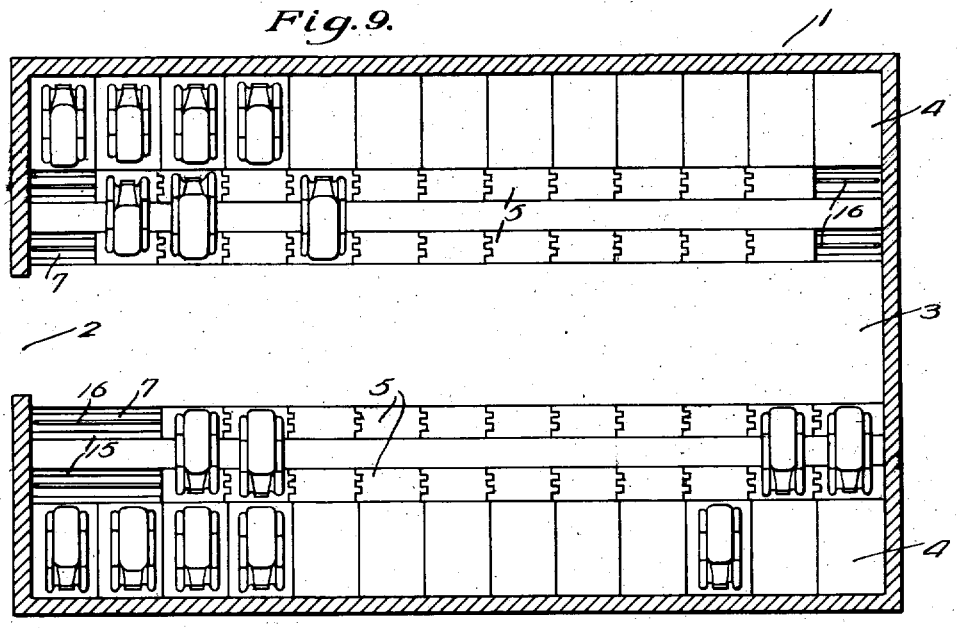
Fig. 11.
Fig. 10.
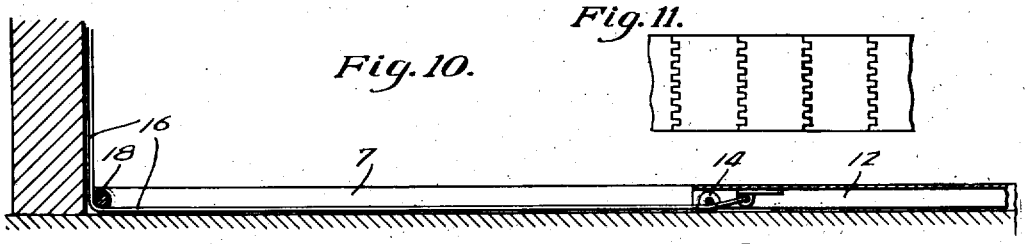
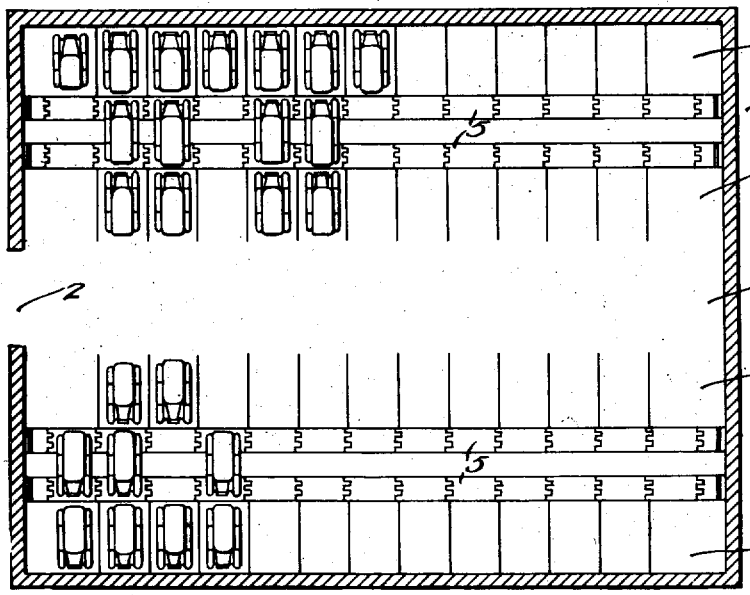
Fig. 8.
INVENTOR
Fernand E. d'Humy
BY Daniel Davis
ATTORNEYS Reissued Sept. 20, 1927. Re. 16,738

UNITED STATES PATENT OFFICE.

FERNAND E. D'HUMY, OF ENGLEWOOD, NEW JERSEY.

STORAGE BUILDING.

Original No. 1,585,471, dated May 18, 1926, Serial No. 39,276, filed June 24, 1925. Application for reissue filed January 21, 1927. Serial No. 162,638.

This invention relates to improvements in building structures, and more particularly to storage buildings, the improvements being especially applicable to garage structures for storing motor vehicles.

It is a common practice to store automobiles, or motor cars, in a garage in such a manner that it is extremely difficult to clear the cars so that they may be driven out of the garage. The cars are frequently placed so close together that it is necessary to manually shift a number of them before the desired one is cleared sufficiently to permit its withdrawal from the garage. This requires the constant services of a number of men in the garage; results in great delays in withdrawing cars from storage, requires that all cars shall be movable, that is to say they cannot be locked in a fixed position in the garage.

It is the main object of this invention to provide a storage building having a large floor area on which cars may be arranged in a plurality of parallel rows and in such a manner that any one of the cars may be readily withdrawn from its storage space. This is accomplished by providing means for bodily shifting one of the rows of the cars longitudinally in either direction whereby the cars in the shiftable row or back of said row may be given a clear driving space so that they may be driven from their places of storage out of the building.

Another object of the invention is to provide a garage having a flush floor space over which the cars may be driven directly to their storage spaces in the several rows, and to provide movable platforms for the support of one row of cars said platforms being flush with the permanent floor of the garage so that cars may be readily driven over them into storage space beyond them and also may be driven directly on said movable platforms and stored thereon. The platforms may be moved in either direction longitudinally of the rows in order to shift the cars resting thereon and thereby provide a clear space through which cars on the movable platforms or in the rows back of the shifted platforms may be driven out.

Another object of the invention is to provide a garage having fixed storage floor spaces and movable storage floor spaces, the movable storage floor spaces being flush with the fixed floor spaces, so that cars may be driven to any selected storage space either on the movable floor space or beyond it on the fixed or non-movable floor space.

Another object of the invention is to provide a garage having a longitudinally extending driving aisle and a movable storage platform arranged along said aisle and of such a width that cars may be stored thereon transversely thereof, said movable platform lying between the driving aisle and a longitudinally extending permanent nonmovable storage floor space onto which cars may be driven over the movable platform, the movable platform being flush with the surface of the driving aisle and with the surface of the non-movable storage space.

Another object of the invention is to provide a movable storage platform made up of a pair of comparatively narrow platform members connected together to move in unison, one member of the platform being adapted to receive and support the front wheels of a car, the other member being designed and properly placed to receive and support the rear wheels of a car. The space in between the two members of the movable platform is a permanent part of the floor structure and is flush with the upper surfaces of the two members of the movable platform. The platform members are flush with the permanent rigid floor of the garage so that cars may be driven directly over them to any storage space on the rigid floor and to any storage space on the movable platform.

Another object of the invention is to form the movable storage platforms longer than the permanent floor space and to provide means whereby the end sections of the platform members may be moved away from the driving floor to thereby permit the storage platforms to be moved in either direction while at the same time providing a flush driving floor throughout the entire length of the building.

There are other objects and advantages of the invention which will appear hereinafter.

Figure 2:
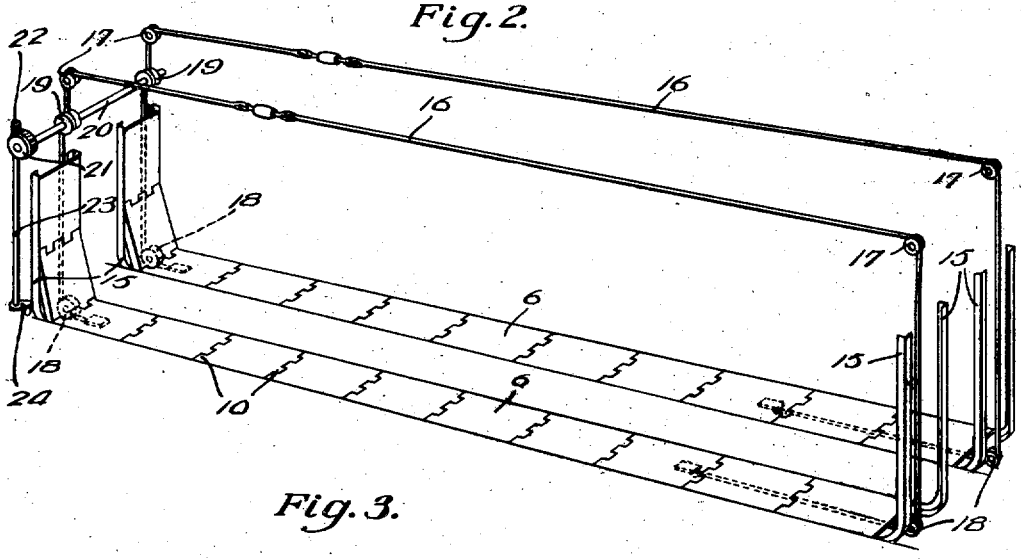
Figure 3:
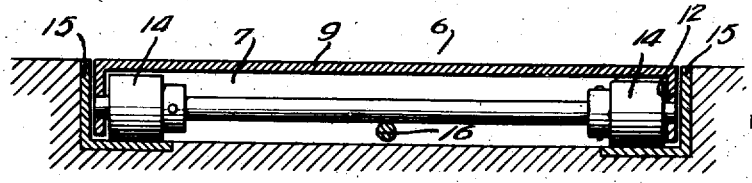
Figure 4:
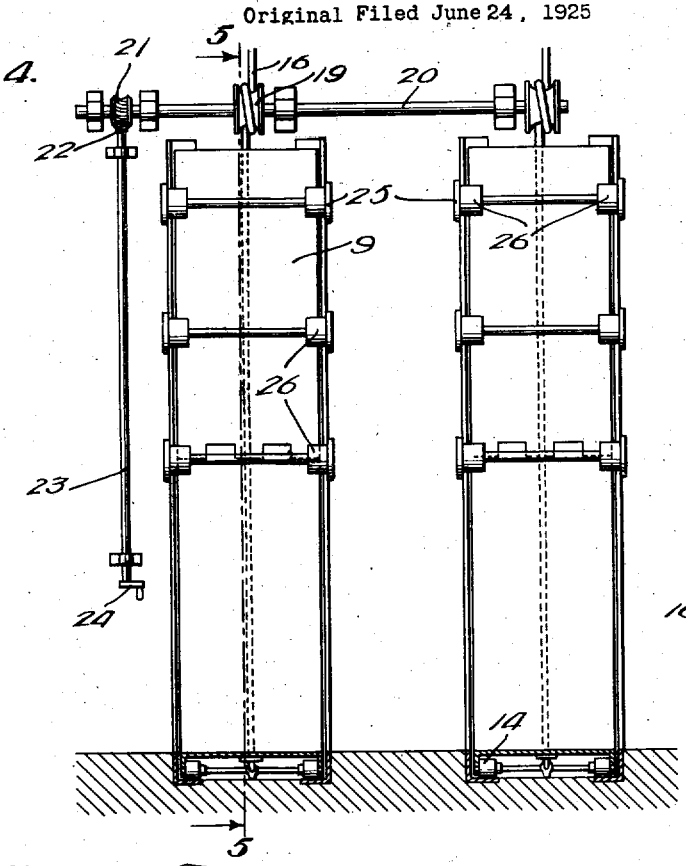
Figure 5:
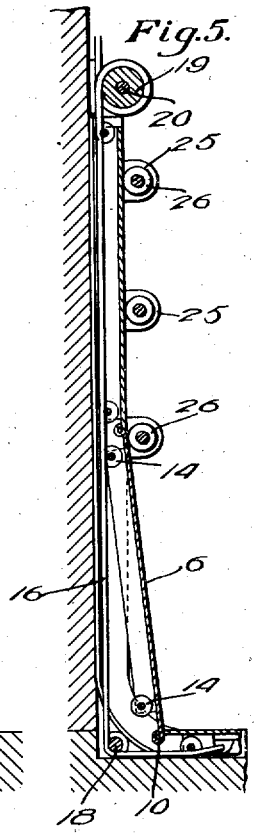
Figure 7:
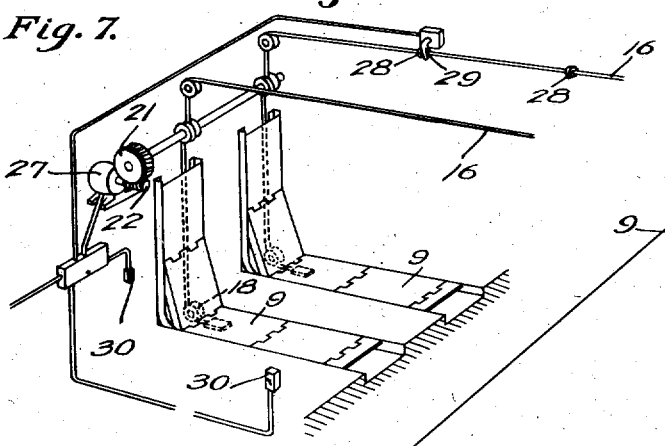
Figure 6:
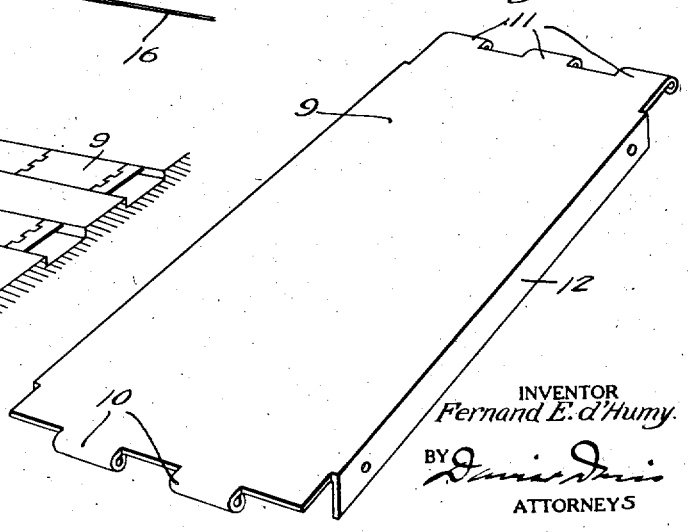

In the drawings:

Fig. 1 is a plan view of a garage floor constructed in accordance with the invention;

Fig. 2 a perspective view of one of the movable storage platforms;

Fig. 3 a transverse vertical sectional view of one member of the movable storage platform;

Fig. 4 is a transverse sectional view of the movable storage platform showing one end thereof turned up;

Fig. 5 a vertical sectional view taken on the line 5—5 of Fig. 4;

Fig. 6 a detail perspective view of one of the sections of the movable platform;

Fig. 7 a detail perspective view of an electrically driven means for moving the platforms;

Fig. 8 a detail plan view of a garage floor arranged for storing three parallel rows of cars on each side of a driving aisle;

Fig. 9 a plan view of a garage floor showing the movable storage platform shorter than the storage floor space of the garage;

Fig. 10 a detail longitudinal sectional view through one end of the movable storage platform; and Fig. 11 a detail view of a portion of a movable platform formed as a single movable member.

Referring to the various parts by numerals, 1 designates the enclosing wall of the garage having a central entrance 2 leading directly to the central longitudinally extending driving aisle 3. Along the longitudinally extending walls of the building are arranged permanent rigid storage floor spaces 4. Parallel with these permanent storage floor spaces are arranged longitudinally extending movable storage platforms 5. These storage platforms run parallel with the driving aisle and parallel with the permanent storage spaces 4 and are arranged between the driving aisle and the storage spaces 4. The upper surfaces of the movable platforms are flush with the driving aisle and the permanent storage spaces so that cars may be driven over said storage platforms into the selected storage compartments on the permanent storage floor spaces 4. With this arrangement of the movable storage platforms the entire garage floor is available for driving purposes.

Each storage platform is preferably formed of a pair of comparatively narrow members 6 suitably spaced apart and fitted down flush in longitudinally extending channels 7. Between these channels is a permanent rigid floor section 8 the upper surface of which is flush with the upper surfaces of the platform members and with the permanent storage floor space. Each of the members of the movable platform is made up of a large number of comparatively thin metal sections 9. Each section 9 is formed at its ends with hinge members 10 which interlock with the corresponding hinge members 11 formed on adjoining and connecting platform sections. These interlocking hinge members are connected together by transversely extending pins so that the platform sections are hinged together, the hinge members being bent downwardly to provide a substantially flat upper surface, the hinge being in the nature of a piano hinge. The longitudinal edges of each of the sections 9 are bent downwardly to form the side flanges 12. In these side flanges 12, near the ends thereof, are rigidly secured transverse rods 13 on which are loosely mounted rollers 14, said rollers being arranged close to the flanges 12. Each channel 7 is provided with longitudinally extending angle irons 15. One member of each angle iron forms one vertical wall of the channel, the other member forming a horizontal trackway at the bottom of the channel. The rollers 14 are arranged to run on said trackways. As shown in the drawings the platform sections 9 are substantially as long as a car storage space and the platform members 6 are spaced apart a sufficient distance to permit the front wheels of the car to rest on one platform member with the rear wheels of the car resting on the other platform member. As shown in Figs. 2 and 4, the movable platform is two sections longer than the garage floor so that the platform may be moved two car spaces in either direction longitudinally, while at the same time providing a complete flush driving surface throughout the entire length of the garage floor. As illustrated in Fig. 2, the two surplus platform sections are turned up at one end of the floor. It is obvious that the platform may be moved and the two surplus sections turned up at the opposite end of the garage floor; or that one section may be turned up at each end of the floor. The position of the surplus or excess platform sections will depend entirely upon the position of the cars and the movement of the platform necessary to free the cars in the inner permanent storage space.

The movable storage platforms may be shifted in either direction longitudinally by any suitable power means. As shown in Figs. 2 and 4 the two parallel platform members are movable endwise or longitudinally, by means of cables, which are attached to the platform members and run over suitable driving drums and guide rollers. Two cables 16 run over guide rollers 17 located in any suitable position, preferably near the ceiling directly over the platform members. The ends of these cables are carried around guide rollers 18 located below the garage floor and are permanently attached to the under side of the third car section inwardly from the ends of the platform members. This leaves two car sections of each platform free of the cables and extending outwardly beyond the points of attachment. At one end of the garage floor the cables 16 are passed around drums 19 rigidly secured to a horizontal shaft 20. On one of these shafts is rigidly secured a worm wheel 21 adapted to be turned through a worm 22 mounted on the upper end of a shaft 23. A crank 24 is secured to the end of the shaft 23 so that said shaft may be turned manually. The ends of the angle iron tracks are turned up at each end of the garage floor to form vertical extensions of the horizontal tracks up which the free sections of the platform members may ride as indicated in Figs. 2 and 5. Brackets 25 extend outwardly from the garage wall and carry rollers 26 which extend inwardly from the brackets and are adapted to be engaged by the turned up sections of the platform members. These rollers serve to hold the turned up sections of the platform members in vertical position and serve as guide rollers to hold the rollers 14 of the platform sections in engagement with the turned up ends of the angle iron tracks 15. By rotating the drums 19 the platform members will be moved longitudinally uniformly in either direction depending upon the direction of rotation of the drums.

In Fig. 7 an electric motor 27 is arranged to drive the worm 22 and the worm wheel 21. On one of the cables 16 is arranged two stops 28 spaced a suitable distance apart and adapted to operate a switch 29 for controlling the motor. By this means the maximum movement of the platform members in either direction is limited. The motor may be started by means of the push button switches 30 located in any convenient position, one switch being arranged to operate the motor in one direction and the other switch completing the circuit in such manner as to drive the motor in the reverse direction.

One method of using the invention is illustrated in Fig. 1 of the drawings. In the upper half of that view the storage space 4 is completely occupied by cars. For convenience of reference these cars are arranged in groups of three, the cars in each group being lettered A, B and C. The cars are arranged on the movable platform members in groups of two with an open car space between each of said groups. The platform members are arranged in central or normal position with one car section of each of the platform members turned up at each end of the garage floor. It is to be noted that cars C may be driven directly out to the main driving aisle through the open spaces directly in front of them. Cars A and B, however, are blocked by the cars on the movable platform members. In order to free cars A the platform members and the cars thereon are moved one car section toward the left hand. This movement of the platform members is illustrated in the lower half of Fig. 1. This movement of the platform members and the cars resting thereon frees the cars A. These cars are lettered A′ in the lower half of the figure. It is to be noted therefore that the cars A′ may be driven out through the free spaces which, by the movement of the platform members, have been brought directly in front of the cars A′. The movable platform members remain in the position shown in the lower half of Fig. 1 until it is necessary to again move them to free the cars B. If it be desired to move the platforms from the position shown in the upper half of Fig. 1 in order to free the cars B said platforms will be moved toward the right one car space in order to bring the free spaces of said platforms directly in front of cars B.

As hereinbefore pointed out the platform members are flush with the garage floor, or substantially so, and the cars may be driven over them to their storage spaces. When the cars are in their storage spaces they may be locked so that they cannot be moved except by the owner thereof. It is also to be noted that in the arrangement of the movable platforms shown in Figs. 1 and 2 there will be always a substantially flush driving surface throughout the garage floor so that the movable platforms are moved only for the purpose of releasing the cars and are not moved for the purpose of placing the cars in the storage spaces.

In the arrangement illustrated in Fig. 8 the movable platforms are arranged longitudinally between two permanent rigid storage spaces $4^a$ and $4^b$. In this arrangement the movable platforms may be shifted back and forth in order to free the cars in the storage space $4^a$. It will also be necessary in this arrangement to shift the movable platforms in order to free the cars stored thereon when the storage spaces $4^b$ are occupied. It will be necessary to leave some free car spaces in the storage space $4^b$, and also to leave free car spaces on the movable platforms.

In the construction illustrated in Figs. 9 and 10 the excess car sections of the movable platforms are dispensed with. In this arrangement the endwise movement of the storage platforms will result in leaving open the shallow channels 7 in which the platforms are mounted. As these channels are very shallow, cars may be driven over them without any serious inconvenience.

As illustrated in Fig. 11 the movable platforms can be constructed of a single sectional member, each hinged section being preferably large enough to support a single car. It is thought that the two parallel, narrow members will be cheaper to manufacture, of less weight and more easily installed than the broader, single-member platforms.

What I claim is:

1. A vehicle storage building comprising a storage and driveway floor having a longitudinally extending driving aisle, a longitudinally extending movable storage and driving platform formed of hinged sections and running parallel with the driving aisle and having its upper surface substantially flush with the surface of the driving aisle, a longitudinally extending rigid permanent storage space parallel with the movable platform and on the opposite side thereof from the driving aisle, the upper surface of said permanent storage space being substantially flush with the upper surface of the said platform, and means for moving the storage and driving platform longitudinally in either direction to permit the vehicles on the permanent storage space beyond the platform to be moved outwardly to the driving aisle over a free unoccupied portion of the said platform.

2. A vehicle storage building comprising a storage and driveway floor having a longitudinally extending driving aisle, a longitudinally extending movable storage and driving platform formed of hinged sections and running parallel with the driving aisle and having its upper surface substantially flush with the surface of the driving aisle said platform being longer than the storage floor, a longitudinally extending rigid permanent storage space parallel with the movable platform and on the opposite side thereof from the driving aisle, the upper surface of said permanent storage space being substantially flush with the upper surface of the said platform, and means for moving the storage and driving platform longitudinally in either direction to permit the vehicles on the permanent storage space beyond the platform to be moved outwardly to the driving aisle over a free unoccupied portion of the said platform.

3. In a vehicle storage building a storage and driveway floor having a longitudinally extending driving aisle, a longitudinally extending movable storage and driving platform formed of two parallel members spaced apart and running parallel with the driving aisle, the upper surfaces of said platform members being substantially flush with the surface of the driving aisle, a longitudinally extending rigid permanent storage space parallel with the movable platform and on the opposite side thereof from the driving aisle, the upper surface of said permanent storage space being substantially flush with the upper surface of the said platform, and means for moving the two members of the storage and driving platform longitudinally simultaneously and uniformly in either direction to permit vehicles on the permanent storage space beyond the platform to be moved outwardly to the driving aisle over a free unoccupied portion of the said platform.

4. In a vehicle storage building, a storage and driveway floor having a longitudinally extending driving aisle, a longitudinally extending movable storage and driving platform comprising two parallel members spaced apart and formed of hinged sections and running parallel with the driving aisle and having the upper surfaces of said platform members substantially flush with the surface of the driving aisle, a longitudinally extending rigid permanent storage space parallel with the movable platform and on the opposite side thereof from the driving aisle, the upper surface of said permanent storage space being substantially flush with the upper surface of the said platform, and means for moving the two members of the storage and driving platform longitudinally simultaneously and uniformly in either direction to permit vehicles on the permanent storage space beyond the platform to be moved outwardly to the driving aisle over a free unoccupied portion of the said platform.

5. In a vehicle storage building, a storage and driveway floor having a longitudinally extending driving aisle, a longitudinally extending movable storage and driving platform comprising two parallel members spaced apart and formed of hinged sections and running parallel with the driving aisle and having the upper surfaces of said platform members substantially flush with the surface of the driving aisle said platform being longer than the storage floor, a longitudinally extending rigid permanent storage space parallel with the movable platform and on the opposite side thereof from the driving aisle, the upper surface of said permanent storage space being substantially flush with the upper surface of the said platform, and means for moving the two members of the storage and driving platform longitudinally in either direction to permit vehicles on the permanent storage space beyond the platform to be moved outwardly to the driving aisle over a free unoccupied portion of the said platform.

6. A vehicle storage building comprising a rigid floor space forming a longitudinally extending driving aisle, a longitudinally extending movable storage and driving platform running parallel with the driving aisle, a longitudinally extending rigid permanent storage space parallel with said platform and on the opposite side thereof from the driving aisle adapted to accommodate a row of vehicles longitudinally on it, the said platform extending throughout substantially the length of said storage space and being formed with a driveway surface extending continuously throughout its length and substantially flush with the surface of the aisle and the surface of the storage space, whereby a vehicle may be driven transversely across the platform at any point in its length, and means for moving the platform longitudinally in either direction to permit the vehicles on the permanent storage space beyond the platform to be moved outwardly to the driving aisle over a free unoccupied portion of the platform.

7. A vehicle storage building comprising a rigid floor space forming a longitudinally extending driving aisle, a longitudinally extending movable storage and driving platform running parallel with the driving aisle, a longitudinally extending rigid permanent storage space parallel with said platform and on the opposite side thereof from the driving aisle adapted to accommodate a row of vehicles longitudinally on it, the said platform being longer than the storage space and adapted to be vertically flexed at its ends and being formed with a driveway surface extending continuously throughout its length, said driveway surface being substantially flush with the surface of the aisle and the surface of the storage space, whereby a vehicle may be driven transversely across the platform at any point in its length, and means for moving the platform longitudinally in either direction to permit the vehicles on the permanent storage space beyond the platform to be moved outwardly to the driving aisle over a free unoccupied portion of the platform 8. A vehicle storage building comprising a rigid floor space forming a longitudinally extending driving aisle, a longitudinally extending movable storage and driving platform running parallel with the driving aisle, a longitudinally extending rigid permanent storage space parallel with said platform and on the opposite side thereof from the driving aisle adapted to accommodate a row of vehicles longitudinally on it, the said platform being longer than the storage space and adapted to have its end portions moved into and out of active vehicle-receiving position and being formed with a driveway surface extending continuously throughout its length, said driveway surface being substantially flush with the surface of the aisle and the surface of the storage space, whereby a vehicle may be driven transversely across the platform at any point in its length, and means for moving the platform longitudinally in either direction to permit the vehicles on the permanent storage space beyond the platform to be moved outwardly to the driving aisle over a free unoccupied portion of the platform.

9. In a vehicle storage building, a storage and driving floor having a straight driveway space and a vehicle entrance directly to said space; an elongated longitudinally movable storage platform continuous from end to end and extending parallel with said driveway space and adapted to have vehicles driven upon it transversely from said floor at any point in its length; and a fixed storage space formed upon the floor between said driveway space and the movable platform and extending longitudinally therealong.

10. In a vehicle storage building, a storage and driving floor having a driveway space; a storage and driving platform normally stationary and substantially flush with the floor and forming a part of the storage and driving floor, said platform being formed of two narrow, elongated, parallel members extending parallel with said driveway space and spaced apart to respectively support the front and rear wheels of a plurality of vehicles disposed transversely of the platform; and means for moving both of said platform members longitudinally forward or backward simultaneously and equally in either direction.

11. In a vehicle storage building, a storage and driving floor having a driveway space; a longitudinally movable storage and driving platform comprising two elongated parallel members running parallel with the driveway space and spaced apart to respectively support the front and rear wheels of vehicles disposed transversely of the platform, the said platform members being adapted to have vehicles driven transversely upon them from the floor; a fixed storage space formed upon the floor and extending along one longitudinal side of the platform; and means for moving both the platform members longitudinally forward or backward, simultaneously and equally in either direction.

12. In a vehicle storage building, a storage and driving floor having a driveway space; a longitudinally movable storage and driving platform comprising two elongated parallel members running parallel with the driveway space and spaced apart to respectively support the front and rear wheels of vehicles disposed transversely of the platform, the said platform members being adapted to have vehicles driven transversely upon them from the floor; vertically flexible ends on said platform members adapted to form part of the driving area of the platform; means for flexing and guiding the said flexible ends when the platform is moved longitudinally; a fixed storage space formed upon the floor and extending along one longitudinal side of the platform; and means for moving both the platform members longitudinally forward or backward, simultaneously and equally in either direction.

13. In a vehicle storage building, a storage and driving floor having a driveway space; an elongated, longitudinally movable storage and driving platform adapted to have vehicles driven upon it transversely from the floor, of greater length than the horizontal space over which it operates and formed with a vertically flexible end adapted to form part of the driving area of the platform; means to flex the said end of the platform and guide its vertical movement when the platform is moved longitudinally; and means for moving the platform longitudinally in either direction.

14. A vehicle storage building comprising a storage and driveway floor having a longitudinally extending straight driving aisle; a vehicle entrance thereto; a longitudinally extending straight movable storage and driving platform formed of hinged sections and running parallel with the driving aisle and having its upper surface substantially flush with the surface of the driving aisle and adapted to have vehicles driven over it at any point in its length; a longitudinally extending rigid permanent storage space parallel with the movable platform and on one side thereof, the upper surface of said permanent storage space being substantially flush with the upper surface of the said platform, and means for moving the storage and driving platform longitudinally in either direction to permit the vehicles on the permanent storage space or on the platform to be moved to the driving aisle.

In testimony whereof I hereunto affix my signature.

FERNAND E. D'HUMY.